United States Patent

[11] 3,584,234

[72] Inventor Bo G. Fredricsson
San Francisco, Calif.

[21] Appl. No. 782,376
[22] Filed Dec. 9, 1968
[45] Patented June 8, 1971
[73] Assignee Lynch Communication Systems, Inc.
San Francisco, Calif.

[54] CARRIER DETECTION CIRCUIT
4 Claims, 3 Drawing Figs.

[52] U.S. Cl. .......... 307/235, 307/236, 307/313, 329/104, 329/102
[51] Int. Cl. .......... H03k 5/20
[50] Field of Search .......... 307/235, 236, 255, 313; 328/26; 329/102, 104, 109

[56] References Cited

UNITED STATES PATENTS

| | | | |
|---|---|---|---|
| 3,099,000 | 7/1963 | Dunning | 307/235X |

*Primary Examiner*—John Kominski
*Assistant Examiner*—James B. Mullins
*Attorney*—Mellin, Moore and Weissenberger

ABSTRACT: A level-sensitive full-wave rectifier with gain, suitable as a carrier detector circuit, which requires, as its active elements, only three transistors, one resistor, and one DC power supply voltage.

INVENTOR.
BO G. FREDRICSSON
BY
Mellin, Moore & Weissenberger
ATTORNEYS

CARRIER DETECTION CIRCUIT

BACKGROUND OF THE INVENTION

Carrier detector circuits such as the circuit of this invention are useful in a wide variety of applications. For example, in data sets, i.e., interface devices between a telephone line and a business machine (such as the one disclosed in my copending application Ser. No. 776,670, filed Nov. 18, 1968), it is desirable to prevent the business machine from receiving spurious or false signals by making sure that the frequency-shift keyed carrier is present at the proper frequency before a signal can be transmitted to the business machine.

This is accomplished by a carrier detection circuit which responds to the presence of a carrier of either the "space" or "mark" frequency by driving an enabling logic which permits the signal to be transmitted to the business machine. If the signal is of a frequency other than the "space" or "mark" frequencies, or if the carrier is absent altogether for an excessive length of time, the signal transmission to the business machine is blocked.

In the prior art, circuits of two principal types have been used for this purpose: one was a simple full-wave rectifier, which provided no gain; and the other was a complex arrangement requiring both a positive and a negative power supply, three transistors, and numerous resistors and even diodes. An example of such a circuit is shown in U.S. Pat. No. 3,289,007.

SUMMARY OF THE INVENTION

The present invention accomplishes the result sought by the prior art in an extremely simple manner by providing a level-sensitive full-wave rectifier with gain, which requires only one power supply voltage, three transistors, and one resistor. (An additional limiting resistor is shown in the drawings in the input lead, but this resistor only serves to protect the transistors and plays no part in the functioning of the circuit.)

The invention accomplishes its results by the novel interconnection of two transistors of one polarity and one transistor of the opposite polarity, as explained in more detail hereinafter, to ground the output whenever the input signal exceeds the base-emitter voltage of the transistors in either direction. Inasmuch as the magnitude of the output voltage is essentially that of the DC power supply voltage, the circuit can be made to have any desired amount of gain.

DESCRIPTION OF THE PREFERRED EMBODIMENT

Figure 1:
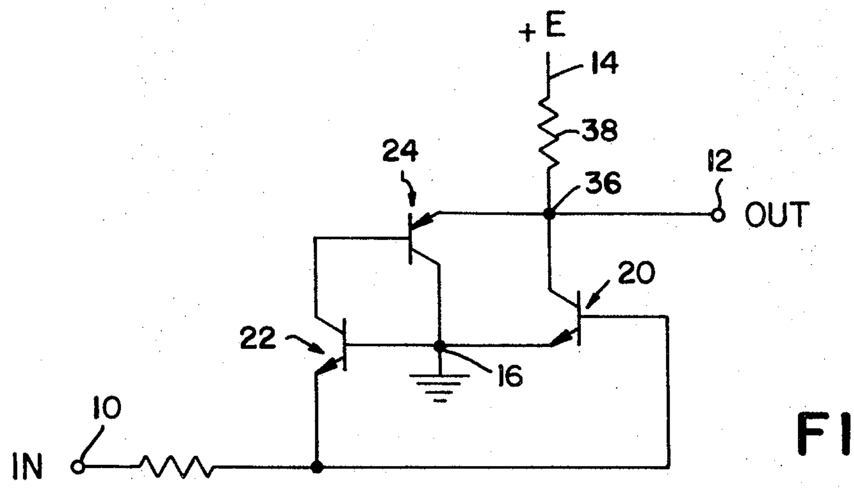
FIG. 1 shows the circuit of this invention.

Referring now to FIG. 1, it will be seen that the terminals of the inventive circuit are the input 10, output 12, and DC supply voltage 14, all of which are referenced to a common reference potential or ground 16.

Figures 2A, 2B:
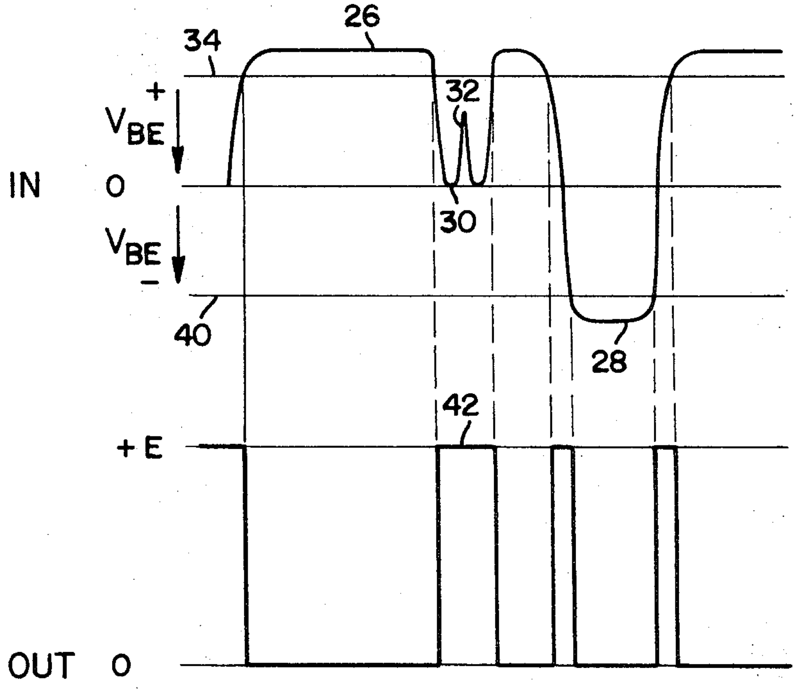
FIG. 2*a* shows the input signal to the circuit.
FIG. 2*b* shows the output signal from the circuit.

The input signal shown in FIG. 2*a* is applied through limiting resistor 18 to the base of transistor 20 and to the emitter of transistor 22. It will be seen from FIG. 2*a* that the input signal (which is derived by conventional means from, e.g., the frequency shift-keyed carrier) consists of a bipolar DC signal. In the contemplated use of the circuit, the input signal slightly exceeds the base-emitter voltage ($V_{BE}$) of transistors 20, 22 and 24 whenever a "space" or "mark" frequency is being received. In the preferred embodiment, receipt of a "space" frequency produces a positive signal 26, whereas receipt of a "mark" frequency produces a negative signal 28.

If a carrier failure occurs, the input voltage will drop to zero as at 30. Random frequency signals on the line may produce noise spikes or false signal 32, but these are not likely to be sufficiently consistent to permit the input voltage at 10 to reach the critical level of $V_{BE}$ (FIG. 2*a*).

When the input signal at 10, upon the occurrence of a "space" signal, reaches and exceeds the critical level 34 of $+V_{BE}$, transistor 20 conducts and effectively grounds point 36 and causes a current to flow through load resistor 38. In effect, the voltage drop in resistor 38 substantially grounds the output 12.

Likewise, when the input signal at 10, upon the occurrence of a "mark" signal, reaches and exceeds the critical level 40 of $-V_{BE}$, transistor 22 conducts. This causes the potential of the base electrode of transistor 24 to drop to the level of the input voltage, i.e., below the critical value $-V_{BE}$. Transistor 24 accordingly also conducts and effectively grounds point 36.

The net result of this operation is that an output voltage 42 of constant magnitude is present whenever neither a "space" nor a "mark" carrier frequency is present, and that this negative output voltage 42 is substantially absent when a "space" or "mark" signal of the proper frequency is detected. It will be obvious that the output signal illustrated in FIG. 2*b* can be used to drive conventional logic and time delay circuits (not shown) in such a manner as to disable the business machine when a carrier failure of significant duration occurs. By the same token, the machine will react to signals only when the carrier detection circuit recognizes them as genuine, and will reject spurious signals such as those detected at 32 (FIG. 2*a*).

A significant advantage of the circuit of this invention is that the output signal, being dependent essentially only on the supply voltage, can be very large compared to the input signal, without requiring a separate amplifier stage, and is therefore directly usable in the appropriate logic circuits.

Although the DC source has been indicated herein as positive, it can equally well be made negative where desired, simply by using transistors of the opposite polarity (i.e., NPN instead of PNP and vice versa). The operation of the circuit remains the same in such a reversal, except for the reversal of the output polarity.

I claim:

1. A level-sensitive full-wave amplifying rectifier circuit, comprising:
a. a signal source referenced to a fixed reference potential;
b. a single source of direct current power referenced to said fixed reference potential;
c. a signal output referenced to said fixed reference potential;
d. a load element connected between said power source and said output;
e. first semiconductor means connected between said fixed potential, said output, and said signal source so as to conduct and thereby substantially short circuit said output to said reference potential when said input signal exceeds a predetermined level in a first polarity;
f. second semiconductor means having a base electrode and a collector-emitter circuit; and
g. third semiconductor means connected between said fixed potential, said signal source, and the base electrode of said second semiconductor means so as to conduct and thereby substantially short circuit said base electrode to said input signal when said input signal exceeds a predetermined level in the other polarity;
h. said second semiconductor means being connected between said fixed potential, said output, and said third semiconductor means so as to conduct and thereby substantially short circuit said output to said reference potential when said base electrode is substantially shorted to said input signal.

2. The circuit of claim 1, in which said second semiconductor means is of one polarity, and said first and third semiconductor means are of the opposite polarity.

3. A level-sensitive full-wave amplifying rectifier circuit, comprising:
a. a source of input signals varying between predetermined positive and negative values with respect to a given ground potential;
b. an output;

c. a power source having a single fixed DC potential with respect to said ground potential;

d. a ground connection;

e. load resistor means connected between said power source and said output;

f. a first transistor having its emitter-collector circuit connected between said output and said ground connection, and having its base connected to said input signal source;

g. a second transistor also having its emitter-collector circuit connected between said output and said ground connection; and h. a third transistor having its emitter-collector circuit connected between the base of said second transistor and said input signal source, and having its base connected to said ground connection.

4. The circuit of claim 3, in which said input signal varies between positive and negative levels each slightly exceeding the base-emitter voltage of said first and third transistors.